US011885272B2

(12) United States Patent
Kikuchi et al.

(10) Patent No.: US 11,885,272 B2
(45) Date of Patent: Jan. 30, 2024

(54) ENGINE CONTROL SYSTEM, ENGINE CONTROL METHOD, AND ENGINE CONTROL PROGRAM (71) Applicant: TOYOTA JIDOSHA KABUSHIKI KAISHA, Toyota (JP)

(72) Inventors: Shigeta Kikuchi, Toyota (JP); Tatsuya Suzuki, Toyota (JP); Hiroaki Mizoguchi, Nagoya (JP); Toshiaki Otani, Nagakute (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/323,326

(22) Filed: May 24, 2023

(65) Prior Publication Data
US 2023/0374948 A1 Nov. 23, 2023

(30) Foreign Application Priority Data
May 25, 2022 (JP) .............................. 2022-085478

(51) Int. Cl.
*F02B 37/18* (2006.01)
*F02D 41/00* (2006.01)
*F02D 41/22* (2006.01)

(52) U.S. Cl.
CPC ........ *F02D 41/0007* (2013.01); *F02B 37/183* (2013.01); *F02D 41/222* (2013.01)

(58) Field of Classification Search
CPC ........... F02B 37/18–186; F02D 41/222; F02D 41/0007
See application file for complete search history.

(56) References Cited

U.S. PATENT DOCUMENTS

2003/0126860 A1* 7/2003 Uraki .................... F02P 5/1504
123/406.52
2023/0126020 A1* 4/2023 Mizoguchi .............. F02B 37/16
60/602

FOREIGN PATENT DOCUMENTS

JP 2008-014289 A 1/2008
JP 2021092181 A * 6/2021
JP 2023063804 A * 5/2023 ............ F02B 37/183

* cited by examiner

Primary Examiner — Ngoc T Nguyen
(74) Attorney, Agent, or Firm — Finnegan, Henderson, Farabow, Garrett & Dunner, LLP (57) ABSTRACT An engine control system according to the present disclosure includes an oil temperature sensor and a waste gate valve control unit. The oil temperature sensor detects a temperature of an engine oil. The waste gate valve control unit controls opening and closing of a waste gate valve based on the temperature of the engine oil detected by the oil temperature sensor. More specifically, when the temperature of the engine oil detected by the oil temperature sensor is equal to or less than a predetermined threshold, the waste gate valve control unit controls the waste gate valve so that it opens.

5 Claims, 5 Drawing Sheets

ENGINE CONTROL SYSTEM, ENGINE CONTROL METHOD, AND ENGINE CONTROL PROGRAM

CROSS REFERENCE TO RELATED APPLICATIONS

This application is based upon and claims the benefit of priority from Japanese patent application No. 2022-085478, filed on May 25, 2022, the disclosure of which is incorporated herein in its entirety by reference.

BACKGROUND

The present disclosure relates to an engine control system, an engine control method, and an engine control program.

Japanese Unexamined Patent Application Publication No. 2008-014289 discloses an engine control apparatus that controls an on-off valve that opens and closes a bypass path bypassing a turbocharger provided in an exhaust path of an engine. The engine control apparatus disclosed in Japanese Unexamined Patent Application Publication No. 2008-014289 forces the on-off valve to perform a closing operation when it is detected that a vehicle is highly likely to be accelerated.

Note that the on-off valve on-off in Japanese Unexamined Patent Application Publication No. 2008-014289 is generally referred to as a waste gate valve and will be referred to as a waste gate valve hereafter in the present specification. The turbocharger operates when the closing operation of the waste gate valve is performed.

SUMMARY

The engine control apparatus disclosed in Japanese Unexamined Patent Application Publication No. 2008-014289 forces the waste gate valve to perform a closing operation before a torque required to operate the turbocharger is requested for the engine when the vehicle is highly likely to be accelerated. By such a structure, the turbocharger operates longer.

As the turbocharger operates longer, the deterioration of an engine oil is accelerated. For this reason, the engine control apparatus disclosed in Japanese Unexamined Patent Application Publication No. 2008-014289 has a problem that an engine oil deteriorates faster.

The present disclosure has been made in order to solve the above problem and an object thereof is to provide an engine control system, an engine control method, and an engine control program that can reduce the deterioration of an engine oil.

An engine control system according to one aspect of the present disclosure is an engine control system including:
  an oil temperature sensor configured to detect a temperature of an engine oil; and
  a waste gate valve control unit configured to control opening and closing of a waste gate valve based on the temperature of the engine oil detected by the oil temperature sensor,
  in which when the temperature of the engine oil detected by the oil temperature sensor is equal to or less than a predetermined threshold, the waste gate valve control unit controls the waste gate valve so that the waste gate valve opens.

The lower the temperature of the engine oil, the easier it is for the engine oil to absorb substances causing oil deterioration. Therefore, when a structure in which the waste gate valve opens when the engine oil is low is employed, the amount of substances causing oil deterioration absorbed by the engine oil can be reduced, and as a result, the deterioration of the engine oil can be reduced.

The above engine control system may further include a requested torque calculation unit configured to calculate a torque requested for an engine from an amount of pressing of an accelerator, in which when the requested torque is equal to or greater than a predetermined threshold, the waste gate valve control unit may control the waste gate valve so that the waste gate valve closes regardless of the temperature of the engine oil.

The above structure improves the responsivity of the engine.

The above engine control system may further include a water temperature sensor configured to detect a temperature of cooling water of the engine, in which when the temperature of the cooling water detected by the water temperature sensor is equal to or less than a predetermined threshold, the waste gate valve control unit may control the waste gate valve so that the waste gate valve opens.

Since there is a correlation between the temperature of the cooling water of the engine and the temperature of the engine oil, the above structure can further reduce the degradation of the engine oil.

An engine control method according to one aspect of the present disclosure is an engine control method including:
  detecting a temperature of an engine oil; and
  controlling opening and closing of a waste gate valve based on the detected temperature of the engine oil,
  in which when the detected temperature of the engine oil is equal to or less than a predetermined threshold, the waste gate valve is controlled so that the waste gate valve opens.

An engine control program according to one aspect of the present disclosure is an engine control program for causing a computer to:
  detect a temperature of an engine oil; and
  control opening and closing of a waste gate valve based on the detected temperature of the engine oil,
  in which when the detected temperature of the engine oil is equal to or less than a predetermined threshold, the waste gate valve is controlled so that the waste gate valve opens.

According to the present disclosure, it is possible to provide an engine control system, an engine control method, and an engine control program that can reduce the deterioration of an engine oil.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS (Mechanism of Problem Occurrence)
<Structure of Engine System>

Figure 1:
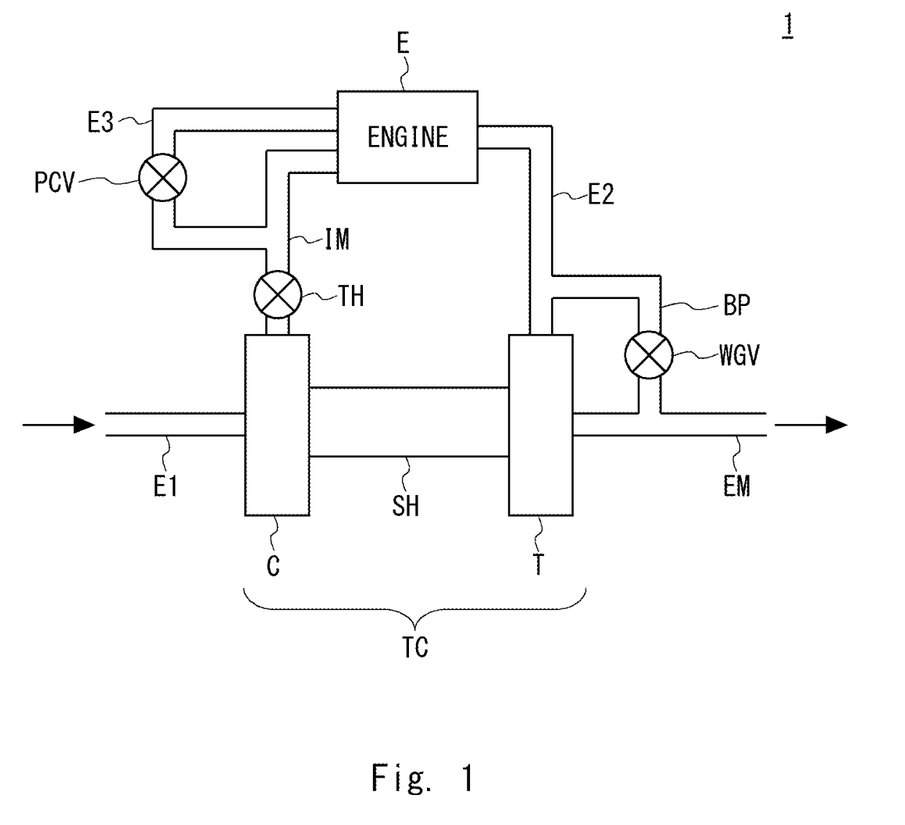
FIG. 1 is a schematic diagram showing a structure of an engine system on which a turbocharger is mounted.

The mechanism by which a problem occurs in the present disclosure will be described in detail. First, a structure of an engine system where the problem occurs will be described in detail. FIG. 1 is a schematic diagram showing a structure of the engine system on which a turbocharger is mounted.

An engine system 1 mainly includes an engine E, a throttle TH, a positive crankcase ventilation (PCV) valve PCV, an intake manifold IM, an exhaust manifold EM, an intake path E1, an exhaust path E2, a blow-by gas exhaust path E3, a turbocharger TC, a bypass path BP, and a waste gate valve WGV.

The engine E is, for example, an internal combustion engine driven by gasoline or the like as fuel. The engine E burns a mixture of fuel and air supplied from the intake manifold IM and outputs a driving force. The engine E discharges exhaust gas generated by combustion into the exhaust path E2. The engine E also discharges a blow-by gas into the blow-by gas exhaust path E3.

However, the blow-by gas here refers to unburned gas and air mixture that have leaked into the crankcase through a gap between a cylinder and a piston included in the engine E.

The blow-by gas discharged from the engine E passes through the blow-by gas exhaust path E3 and joins the air passing through the intake manifold IM. It is then supplied again to the engine E.

Air is supplied to the engine system 1 through the intake path E1 and the intake manifold IM. More specifically, the air supplied from the intake path E1 flows through the turbocharger TC to the intake manifold IM, and is supplied to the engine E. Note that the air supplied through the intake manifold IM includes a blow-by gas supplied from the blow-by gas exhaust path E3.

Exhaust gas discharged from the engine system 1 is discharged from the exhaust path E2. More specifically, the exhaust gases discharged from the engine E are exhausted from the exhaust manifold EM through the turbocharger TC or the bypass path BP.

The PCV valve PCV is a valve that prevents air flowing through the intake manifold IM from flowing into the blow-by gas exhaust path E3. That is, the PCV valve PCV is an air valve that regulates the direction in which gas flows from the blow-by gas exhaust path E3 side to the intake manifold IM side.

The throttle TH is a valve that adjusts the amount of air supplied to the engine E. More specifically, the amount of air supplied to the engine E is adjusted by controlling a position of the throttle TH. The position of the throttle TH is controlled so that the more torque is requested for the engine, the more air is supplied to the engine E.

The turbocharger TC compresses the air supplied from the intake path E1 and supplies it to the engine E. The turbocharger TC discharges the exhaust gas from the engine E to the exhaust manifold EM. The turbocharger TC includes a turbine T, a compressor C, and a shaft SH.

The exhaust gas exhausted by the engine E is supplied to the turbine T through the exhaust path E2. The turbine T is rotated by the supplied exhaust gas. The turbine T is connected to the compressor C through the shaft SH. Therefore, the compressor C is rotationally driven by the rotation of the turbine T. The exhaust gas that has passed through the turbine T is discharged to the exhaust manifold EM.

The compressor C rotationally driven by the turbine T compresses air supplied from the intake path E1. The compressor C then supplies the compressed air to the engine E through the intake manifold IM.

When such compressed air is supplied to the engine E, the magnitude of the torque that the engine E can output is improved.

The bypass path BP bypasses the exhaust path E2 and the exhaust manifold EM. That is, the bypass path BP is a path for the exhaust gas discharged from the engine E to the exhaust manifold EM without having to pass through the turbine T. The amount of exhaust gas flowing into the bypass path BP is controlled by the waste gate valve WGV.

The waste gate valve WGV adjusts the amount of exhaust gas flowing through the bypass path BP.

When the waste gate valve WGV is closed, no exhaust gas flows through the bypass path BP. In such a case, the exhaust gas discharged from the exhaust path E2 is discharged through the turbine T. Therefore, the turbine T and the compressor C are rotated, and as a result, compressed air is supplied to the engine E.

On the other hand, when the waste gate valve WGV is open, exhaust gas flows through the bypass path BP. In such a case, the exhaust gas discharged from the exhaust path E2 hardly flows through the turbine T. Therefore, the turbine T and the compressor C are not rotated, and as a result, uncompressed air is supplied to the engine E.

That is, when the waste gate valve WGV is closed, the turbocharger TC operates. Further, when the waste gate valve WGV is open, the turbocharger TC does not operate.

<Deterioration of Engine Oil>

In the following description, a case in which the waste gate valve WGV is closed, that is, a case in which the turbocharger TC is in operation, will be considered.

When the turbocharger TC is in operation, the exhaust gas is discharged through the turbine T. Thus, the pressure of the gas flowing through the exhaust path E2 increases. As the pressure in the exhaust path increases, the amount of work that the engine E does to the gas increases. Thus, the magnitude of the torque that the engine E can output by taking in per unit of air is reduced.

Therefore, regarding the above two cases, when the amount of the torque requested for the engine E is the same as each other, more air has to be supplied to the engine E in the case in which the turbocharger TC is in operation than to the engine E in the case in which the turbocharger TC is not in operation.

When a larger amount of air is supplied to the engine E, the amount of air flowing through the intake manifold IM increases. As the amount of air flowing through the intake manifold IM increases, the air pressure in the intake manifold IM increases.

Incidentally, when the air pressure in the intake manifold IM increases, the amount of discharge of a blow-by gas is reduced. That is, as the air pressure in the intake manifold IM increases, the ventilation rate of the blow-by gas in the engine E is reduced.

Therefore, when the turbocharger TC is in operation, the ventilation rate of the blow-by gas in the engine E is reduced. As a result, the concentration of the blow-by gas in the engine E increases.

A blow-by gas contains substances causing the deterioration of the engine oil, such as nitrogen oxides. Therefore, as the concentration of the blow-by gas in the engine E increases, the deterioration of the engine oil is accelerated.

That is, when the waste gate valve WGV is closed, a problem occurs in which the deterioration of the engine oil is accelerated.

<Overview of Embodiment>

In the engine control system according to the present disclosure, the waste gate valve opens when the temperature of an engine oil is equal to or less than a predetermined threshold in order to reduce the deterioration of the engine oil.

First Embodiment

<Structure of Engine Control System>

A first embodiment according to the present disclosure will be described in detail below with reference to the drawings.

Figure 2:
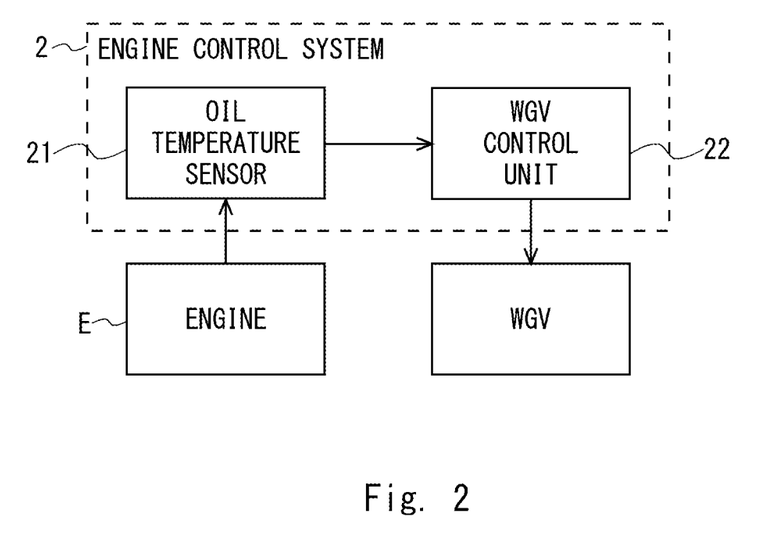
FIG. 2 is a block diagram showing a structure of an engine control system according to a first embodiment.

First, the structure of an engine control system according to this embodiment will be described in detail. FIG. 2 is a block diagram for explaining the structure of the engine control system according to the first embodiment. In the following description, FIG. 1 is referred to as appropriate.

An engine control system 2 according to this embodiment controls the engine system 1 shown in FIG. 1. The engine control system 2 acquires the temperature of the engine oil in the engine E. Then, it controls opening and closing of the waste gate valve WGV based on the acquired temperature of the engine oil.

The engine control system 2 according to this embodiment includes an oil temperature sensor 21 and a waste gate valve control unit 22.

The oil temperature sensor 21 is a temperature sensor attached to the engine E, which detects a temperature of the engine oil in the engine E. The oil temperature sensor 21 outputs the acquired temperature to the waste gate valve control unit 22.

The waste gate valve control unit 22 acquires the temperature of the engine oil in the engine E from the oil temperature sensor 21. It then controls opening and closing of the waste gate valve WGV based on the temperature of the engine oil detected by the oil temperature sensor 21.

More specifically, when the temperature of the engine oil detected by the oil temperature sensor 21 is equal to or less than a predetermined threshold, the waste gate valve control unit 22 controls the waste gate valve WGV so that it opens.

Note that, when the temperature of the engine oil detected by the oil temperature sensor 21 is not equal to or less than a predetermined threshold, the waste gate valve control unit 22 may control the waste gate valve WGV so that it opens or closes.

When the engine oil temperature detected by the oil temperature sensor 21 is not equal to or less than a predetermined threshold, the waste gate valve control unit 22 may control opening and closing of the waste gate valve WGV based on, for example, a torque requested for the engine E and the position of the throttle TH.

<Operations of Engine Control System>

Figure 3:
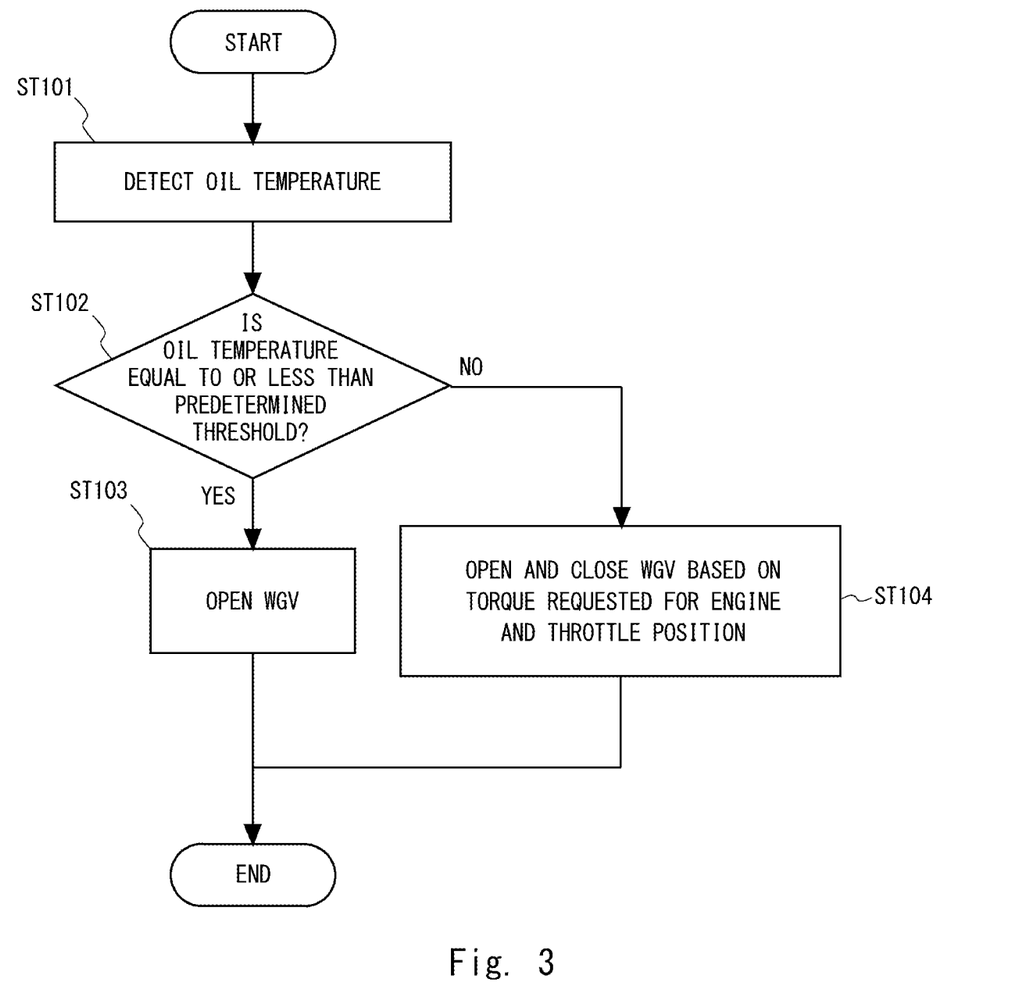
FIG. 3 is a flowchart showing operations of the engine control system according to the first embodiment.

Next, operations of the engine control system, that is, an engine control method according to the first embodiment will be described in detail. FIG. 3 is a flowchart showing the operations of the engine control system according to the first embodiment. In the following description, FIGS. 1 and 2 are referred to as appropriate.

First, the oil temperature sensor 21 detects an oil temperature (Step ST101). The detected oil temperature is output to the waste gate valve control unit 22.

Next, the waste gate valve control unit 22 determines whether or not the oil temperature is equal to or less than a predetermined threshold (Step ST102).

When the oil temperature is equal to or less than a predetermined threshold (YES in Step ST102), the waste gate valve control unit 22 opens the waste gate valve WGV (Step ST103), and the engine control system 2 ends the series of operations.

When the oil temperature is not equal to or less than a predetermined threshold (NO in Step ST102), the waste gate valve control unit 22 opens and closes the waste gate valve WGV based on a torque requested for the engine and a throttle position (Step ST104), and the engine control system 2 ends the series of operations.

The engine control system 2 according to this embodiment may repeatedly execute the series of operations shown in the flowchart in FIG. 3. Further, the engine control system 2 may repeatedly execute the series of operations, and at the time when Step ST104 is executed, it may end the repetition of the series of operations.

As described above, the engine control system 2 according to this embodiment detects the temperature of the engine oil. The engine control system 2 then controls opening and closing of the waste gate valve WGV based on the detected temperature.

By such a structure, the turbocharger can be prevented from operating when the temperature of the engine oil is low, that is, when the engine oil is likely to deteriorate. As a result, the engine control system 2 can reduce the degradation of the engine oil.

Further, when the temperature of the engine oil is low, the engine oil is not sufficiently spread inside the engine in some cases. Therefore, in the case in which the temperature of the engine oil is low, when the turbocharger is prevented from operating, the engine control system 2 can reduce the degradation of the engine.

Second Embodiment

<Structure of Engine Control System>

A second embodiment according to the present disclosure will be described in detail below with reference to the drawings.

Figure 4:
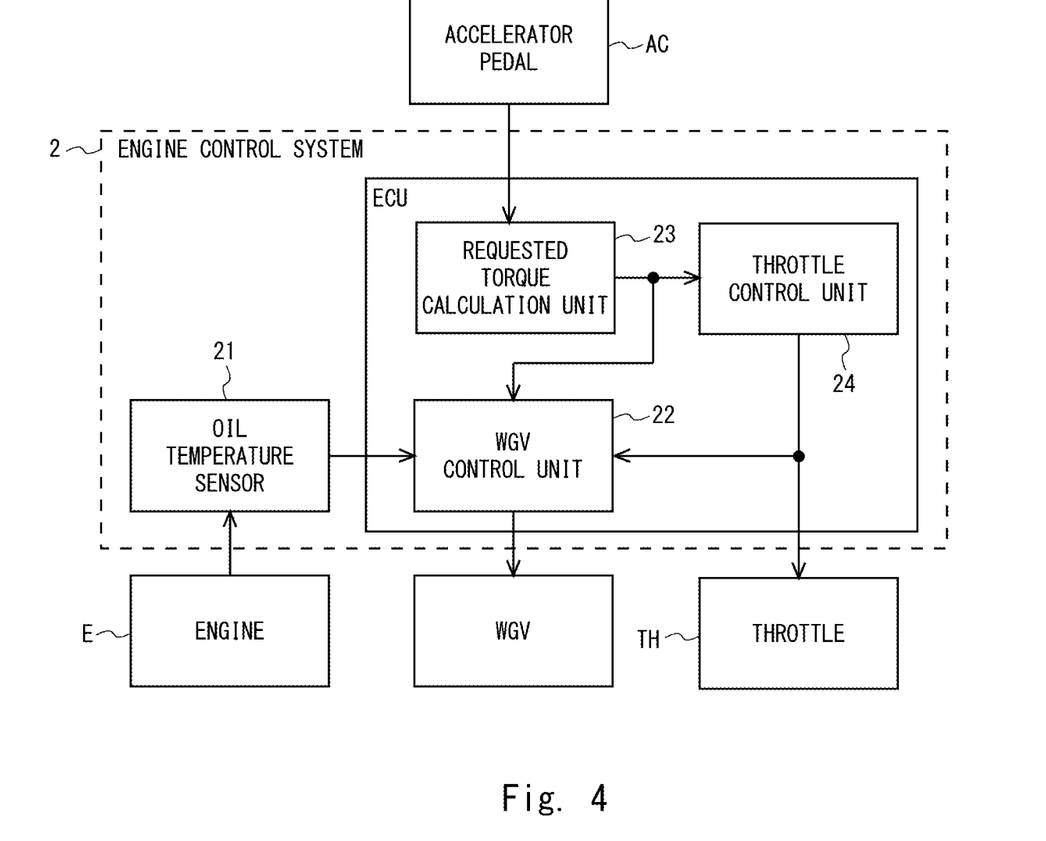
FIG. 4 is a block diagram showing a structure of an engine control system according to a second embodiment.

First, the structure of an engine control system according to this embodiment will be described in detail. FIG. 4 is a block diagram for explaining the structure of the engine control system according to the second embodiment. In the following description, FIG. 1 is referred to as appropriate.

The engine control system 2 according to this embodiment is an application example of the engine control system 2 according to the first embodiment. The engine control system 2 according to this embodiment differs from the engine control system 2 according to the first embodiment in that it includes a requested torque calculation unit 23 and a throttle control unit 24.

Note that a preferred embodiment of the oil temperature sensor 21 is similar to that according to the first embodiment.

Further, in the engine control system 2 according to this embodiment, the waste gate valve control unit 22, the requested torque calculation unit 23, and the throttle control unit 24 are implemented as functional blocks of an engine control unit ECU.

The engine control unit ECU includes, for example, an arithmetic unit such as a CPU (Central Processing Unit), which is not shown, and a storage unit such as a RAM (Random Access Memory) and a ROM (Read Only Memory) in which a program and data for controlling the engine system 1 are stored. That is, the engine control unit ECU has functions as a computer, and controls the engine system 1 based on the above program.

Therefore, each of the functional blocks composing the engine control unit ECU shown in FIG. 4 can be configured by the CPU, the storage unit, and other circuits in terms of hardware, and can be implemented by the program for controlling the engine system 1 stored in the storage unit in terms of software. That is, the engine system 1 can be implemented in various forms by hardware, software, or a combination thereof.

Note that the program includes a group of instructions (or software code) to cause the computer to perform one or more functions described in the embodiment when read into the computer. The program may be stored on non-temporary computer readable media or physical storage media. By way of example and not limitation, computer-readable media or physical storage media include random-access memory (RAM), read-only memory (ROM), flash memory, solid-state drive (SSD) or other memory technology, CD-ROM, digital versatile disc (DVD), Blu-ray (R) disc or other optical disk storage, magnetic cassette, magnetic tape, magnetic disk storage or other magnetic storage device. The program may be transmitted on a temporary computer-readable or communication medium. By way of example and not limitation, a temporary computer-readable medium or communication medium includes a propagating signal in an electrical, optical, acoustic or other form.

The requested torque calculation unit 23 acquires the amount of pressing of an accelerator pedal AC of the vehicle. Then, the torque requested for the engine E is calculated based on the acquired amount of pressing of the accelerator pedal AC. The requested torque calculation unit 23 outputs the calculated requested torque to the waste gate valve control unit 22 and the throttle control unit 24.

The throttle control unit 24 controls the position of the throttle TH, i.e., the amount of air supplied to the engine E. More specifically, the throttle control unit 24 controls the amount of air supplied to the engine E based on the requested torque acquired from the requested torque calculation unit 23.

The throttle control unit 24 controls the position of the throttle TH so that the larger the requested torque acquired from the requested torque calculation unit 23, the more air is supplied to the engine E.

Note that the larger the position of the throttle, the more the throttle TH supplies air to the engine E.

The throttle control unit 24 outputs a control signal indicating the position of the throttle TH to the throttle TH. Further, the throttle control unit 24 also outputs a control signal indicating the position of the throttle TH to the waste gate valve control unit 22.

The waste gate valve control unit 22 according to this embodiment first determines whether or not the torque requested for the engine E acquired from the requested torque calculation unit 23 is equal to or greater than a predetermined threshold.

Then, when the torque requested for the engine E is equal to or greater than a predetermined threshold, the waste gate valve control unit 22 controls the waste gate valve WGV so that it closes regardless of the temperature of the engine oil.

By such a structure, even when a driver requests a torque that cannot be output without using a turbocharger, the requested torque can be output. As a result, the responsivity of the engine is improved and the maneuverability of the vehicle is improved.

When the torque requested for the engine E is equal to or greater than a predetermined threshold, the waste gate valve control unit 22 acquires the temperature of the engine oil and the throttle position. The waste gate valve control unit 22 controls opening and closing of the waste gate valve WGV based on the acquired oil temperature and the throttle position.

More specifically, like in the first embodiment, the waste gate valve control unit 22 controls the waste gate valve WGV so that it opens when the temperature of the engine oil is equal to or less than a predetermined threshold.

When the temperature of the engine oil is not equal to or less than a predetermined threshold, the waste gate valve control unit 22 determines whether or not the value of the throttle position is equal to or greater than a predetermined threshold.

The waste gate valve control unit 22 then controls the waste gate valve WGV so that it closes when the value of the throttle position is equal to or greater than a predetermined threshold.

Further, the waste gate valve control unit 22 controls the waste gate valve WGV so that it opens when the value of the throttle position is not equal to or greater than a predetermined threshold.

By such a structure, the compression of the air supplied to the engine E can be started before the torque that cannot be output without the operation of the turbocharger is requested, and thus the responsivity of the engine is improved.

<Operations of Engine Control System>

Figure 5:
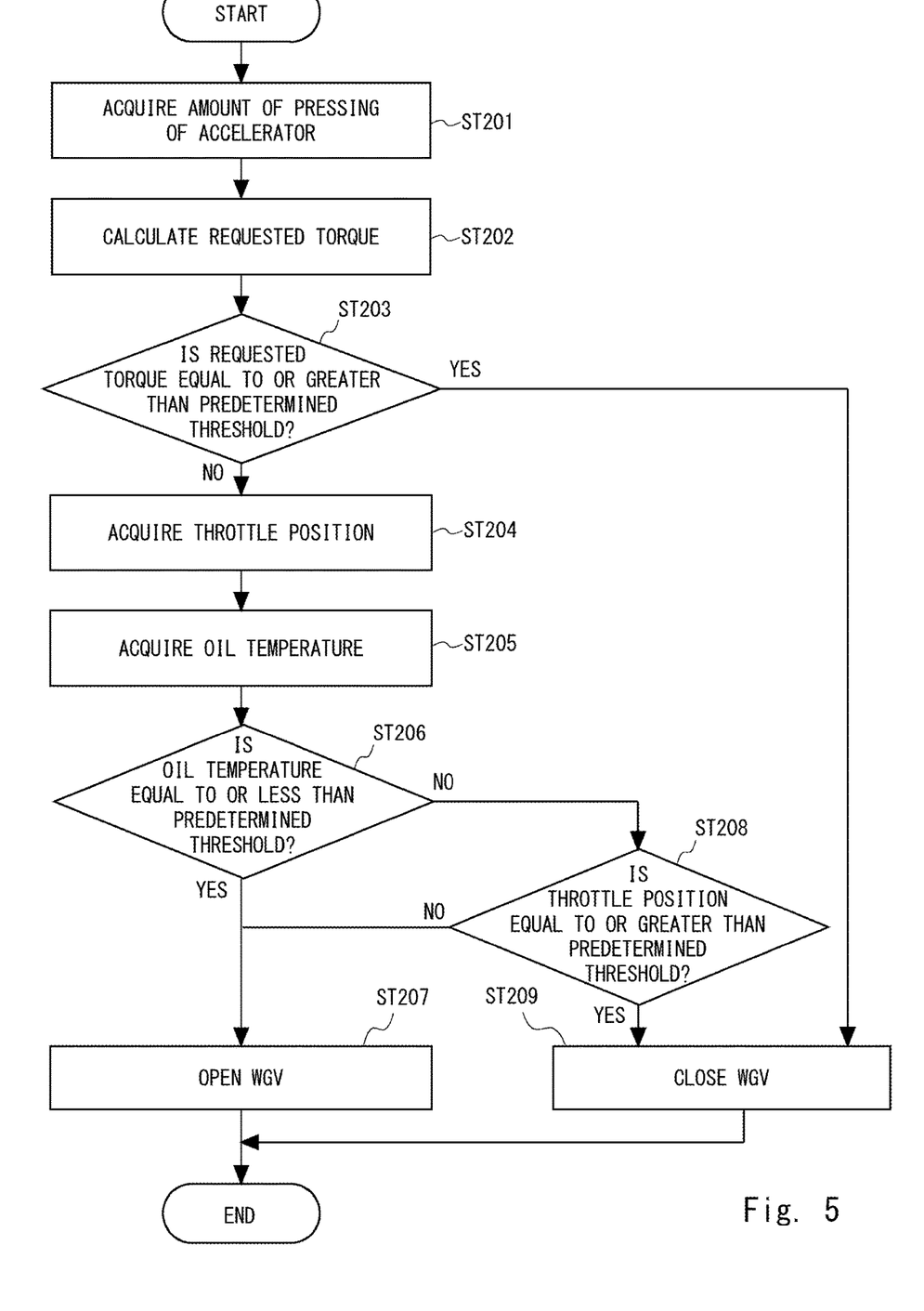
FIG. 5 is a flowchart showing operations of the engine control system according to the second embodiment.

Next, operations of the engine control system, that is, an engine control method according to the second embodiment will be described in detail. FIG. 5 is a flowchart showing the operations of the engine control system according to the second embodiment. In the following description, FIGS. 1 and 4 are referred to as appropriate.

First, the requested torque calculation unit acquires the amount of pressing of the accelerator (Step ST201) and calculates the requested torque (Step ST202). The calculated requested torque is output to the waste gate valve control unit 22.

Next, the waste gate valve control unit 22 determines whether or not the requested torque is equal to or greater than a predetermined threshold (Step ST203).

When the requested torque is equal to or greater than a predetermined threshold (YES in Step ST203), the waste gate valve control unit 22 closes the waste gate valve (Step ST209), and the engine control system 2 ends the series of operations.

When the requested torque is not equal to or greater than a predetermined threshold (NO in Step ST203), the waste gate valve control unit 22 acquires the throttle position from the throttle control unit 24 (Step ST204). Then the waste gate valve control unit 22 acquires the oil temperature from the oil temperature sensor 21 (Step ST205).

However, Steps ST204 and ST205 may be executed in reverse order.

Further, Step ST204 and Step ST205 may be operations executed in parallel.

Next, the waste gate valve control unit 22 determines whether or not the oil temperature is equal to or less than a predetermined threshold (Step ST206).

When the oil temperature is equal to or less than a predetermined threshold (YES in Step ST206), the waste gate valve control unit 22 opens the waste gate valve (Step ST207), and the engine control system 2 ends the series of operations.

When the oil temperature is not equal to or less than a predetermined threshold (NO in Step ST206), the waste gate valve control unit 22 determines whether or not the value of the throttle position is equal to or greater than a predetermined threshold (Step ST208).

When the value of the throttle position is equal to or greater than a predetermined threshold (YES in Step ST208), the waste gate valve control unit 22 closes the waste gate valve (Step ST209), and the engine control system 2 ends the series of operations.

When the value of the throttle position is not equal to or greater than or equal to a predetermined threshold (NO in Step ST208), the waste gate valve control unit 22 opens the waste gate valve (Step ST207), and the engine control system 2 ends the series of operations.

The engine control system 2 according to this embodiment may repeatedly execute the series of operations shown in the flowchart in FIG. 5.

As described above, the engine control system 2 according to this embodiment opens the waste gate valve and prevents the turbocharger from operating when the temperature of the engine oil is equal to or less than a predetermined threshold. As a result, the engine control system 2 can reduce the degradation of the engine oil.

Further, even in a case in which the temperature of the engine oil is equal to or less than a predetermined threshold, the engine control system 2 according to this embodiment operates the turbocharger when a driver requests a magnitude of the torque that requires the operation of the turbocharger.

By such a structure, the engine control system 2 can improve the responsivity of the engine while reducing the degradation of the engine oil.

Other Embodiments

The engine control system according to the present disclosure may further include a water temperature sensor that detects a temperature of cooling water of the engine.

Further, when the temperature of the cooling water detected by the water temperature sensor is equal to or less than a predetermined threshold, the waste gate valve control unit may control the waste gate valve so that it opens.

There is a correlation between the temperature of the cooling water of the engine and the temperature of the engine oil. Therefore, by the above structure, the degradation of the engine oil can be further reduced.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An engine control system comprising:
   an oil temperature sensor configured to detect a temperature of an engine oil; and
   a waste gate valve control unit configured to control opening and closing of a waste gate valve based on the temperature of the engine oil detected by the oil temperature sensor,
   wherein when the temperature of the engine oil detected by the oil temperature sensor is equal to or less than a predetermined threshold, the waste gate valve control unit controls the waste gate valve so that the waste gate valve opens.

2. The engine control system according to claim 1, further comprising a requested torque calculation unit configured to calculate a torque requested for an engine from an amount of pressing of an accelerator,
   wherein when the requested torque is equal to or greater than a predetermined threshold, the waste gate valve control unit controls the waste gate valve so that the waste gate valve closes regardless of the temperature of the engine oil.

3. The engine control system according to claim 1, further comprising a water temperature sensor configured to detect a temperature of cooling water of the engine,
   wherein when the temperature of the cooling water detected by the water temperature sensor is equal to or less than a predetermined threshold, the waste gate valve control unit controls the waste gate valve so that the waste gate valve opens.

4. An engine control method comprising:
   detecting a temperature of an engine oil; and
   controlling opening and closing of a waste gate valve based on the detected temperature of the engine oil,
   wherein when the detected temperature of the engine oil is equal to or less than a predetermined threshold, the waste gate valve is controlled so that the waste gate valve opens.

5. A non-transitory computer readable medium storing a engine control program for causing a computer to:
   detect a temperature of an engine oil; and
   control opening and closing of a waste gate valve based on the detected temperature of the engine oil,
   wherein when the detected temperature of the engine oil is equal to or less than a predetermined threshold, the waste gate valve is controlled so that the waste gate valve opens.

* * * * *